United States Patent [19]

Lindeman

[11] 3,993,272

[45] Nov. 23, 1976

[54] SHEET METAL FASTENER

[75] Inventor: Richard Jay Lindeman, Elmwood Park, Ill.

[73] Assignee: Illinois Tool Works Inc., Chicago, Ill.

[22] Filed: Dec. 19, 1974

[21] Appl. No.: 534,536

[52] U.S. Cl. ............................... 248/73; 24/73 SA
[51] Int. Cl.² ........................................ F16L 3/00
[58] Field of Search ............ 248/73, 74 R; 24/73 B, 24/73 AS, 73 SA, 73 AP, 73 PB, 81 B

[56] References Cited
UNITED STATES PATENTS

| | | | |
|---|---|---|---|
| 2,744,708 | 5/1956 | Bedford | 248/73 |
| 2,944,313 | 7/1960 | Reiland | 24/214 |
| 2,980,478 | 4/1961 | Woehrle | 24/73 B |
| 3,210,030 | 10/1965 | Ramsey et al. | 248/73 |
| 3,226,069 | 12/1965 | Clarke | 248/73 |
| 3,651,546 | 3/1972 | Hartmann | 24/73 SA |
| 3,854,001 | 12/1974 | Dola | 24/73 SA |

Primary Examiner—Paul R. Gilliam
Assistant Examiner—Kenneth J. Dorner
Attorney, Agent, or Firm—Robert W. Beart; J. R. Halvorsen

[57] ABSTRACT

A sheetmetal fastener device to be inserted into and mounted on the interior of a slotted hollow support member. The clip is self-retained and capable of supporting a cable strap or similar means which in turn will maintain one or more elongated objects, such as cables or conduits, in fixed relation to the support member.

4 Claims, 3 Drawing Figures

U.S. Patent   Nov. 23, 1976   3,993,272
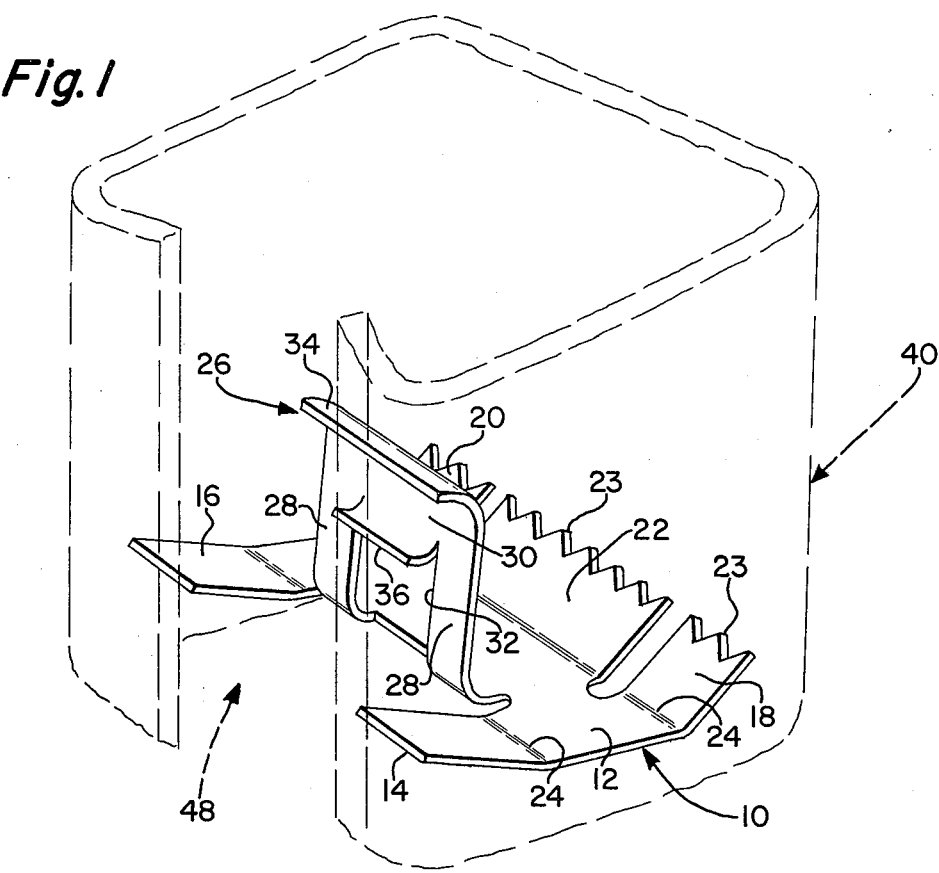
Fig. 1
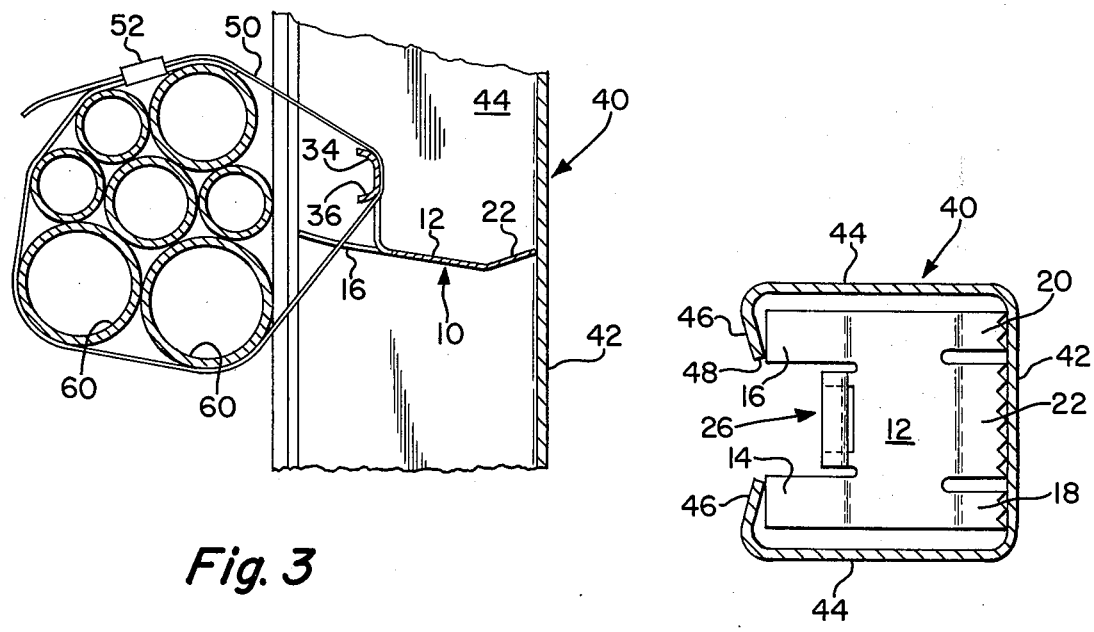
Fig. 3
Fig. 2

SHEET METAL FASTENER

BACKGROUND OF THE INVENTION

In the construction trade it is often desirable to maintain one or more cables or conduits in fixed relation to support means. Often it is necessary to add to such a bundle of elongated elements or to remove one or more elements from the bundle. It has been common practice in the past to install expansion anchors in solid walls or to drill holes in other support means and utilize screw threaded fasteners. The use of such fasteners is a time consuming process and hence involves a large labor charge. Additionally, when modifications or changes are required several holes or damage to the walls or support means will be evident and have an undesirable effect from an aesthetic standpoint.

SUMMARY OF THE INVENTION

It is an object of the present invention to provide a simple one-piece sheetmetal fastener which can be utilized with a hollow tube-like support member having a longitudinal slot therein. The fastener can be positioned by insertion through the slot, being twisted 90° and moved into engaged mounted position in a quick expeditious manner. The selection of the position within the parameters of the length of the tubular support member are infinite. A cable strap or similar supportive means is passed through the slot of the support member, engaged with means on the clip and thence wrapped around the bundle of cables or conduits to support same in transverse relation to the supporting tube. This particular type of fastener has been found particularly efficacious in underground railways where signal cables must be run parallel to the track and are subject to revision and repair at frequent intervals. Depending upon the type of strap member utilized the cables can be initially inserted, added to or subtracted from in an expeditious manner.

DESCRIPTION OF DRAWINGS

FIG. 1 is a perspective view of one embodiment of the present invention shown in mounted position of a slotted tubular member which member is shown in phantom;

FIG. 2 is a plan view of the embodiment shown in FIG. 1 in mounted position but with the tube being shown in section; and FIG. 3 is a vertical elevation in partial section of a fastener of the type contemplated by the present invention in mounted position and with a cable strap supporting elongated elements such as cables or conduits.

Referring now to the drawings; a preferred embodiment of the present invention is a fastener or clip 10 preferably fabricated from heat treatable carbon steel to provide spring characteristics and strength. Such a clip includes a base 12 and two or more legs 14–22 extending outwardly from opposite edges of the base 12, which in this embodiment is generally rectangular in configuration. In the preferred embodiment there are provided a pair of outboard legs 14 and 16 extending in the same direction while extending in the opposite direction from base 12 are a pair of outboard legs 18 and 20. Each of legs 14–20 are disposed in angular relationship to base 12 along bend-lines 24 for purposes best set forth hereinafter. Extending upwardly from base 12, intermediate the front legs 14 and 16, is an apertured retaining arm 26. The retaining arm 26 includes a pair of elements 28 joined at their upper free end by a transverse bar 30 forming a central aperture 32. The edges of the transverse bar 30 are bent forwardly to provide a radiused surface 34 and 36 for purposes best set forth hereinafter. Since the clip is designed to accept a flexible retainer member through the aperture 32 it has been found desirable to provide an additional leg 22 extending from the opposite edge to engage a support and to counteract the torque imposed on the retaining arm 26 as transmitted through the base 12. Similarly, experience has taught that while a straight edge at the free extremity of the arms will bite into a support, it is desirable on the rear legs 18, 20 and 22 to serrate such edges and thereby provide teeth 36 for additional biting engagement.

The clip is designed for use with a hollow tube 40 having a base wall 42, side walls 44 and a pair of inwardly directed flanges 46 whose spaced free edges forms the slot 48. The clip is inserted with its base 12 in a position parallel to the slot 48 and thence rotated 90° to bring the legs 14 and 16 into engagement with the flanges 46 and the legs 18, 20 and 22 in engagement with the inner surface of the base wall 42. With each of the legs being angularly disposed a stress is placed upon them, since the distance from the free edge of the legs 14–16 to the free edge of legs 18–22 is generally less than the measurement from the flanges 46 to the base wall 42, the legs will flex slightly and bite into the interior wall of the support member 40. Any attempt to dislodge the clip tends to straighten out the legs into a relationship tending to be coplanar with the base 12 and hence causes the teeth to more aggressively bite in the support member 40.

When the clip 10 is in installed position a cable strap 50 or other suitable flexible means can be fed through the slot 48, the aperture 32, and brought to bear on the curved surfaces 34–36. Elongated elements such as cables or conduits 60 are then positioned and the strap 50 brought into encircling relationship and locked by suitable means such as the clamp 52. It will be appreciated that the weight of the elongated members 60 will tend to apply a force generally in the direction of the arrow A which would tend to bring a rotative force on the base 12. The additional leg 22 counteracts this and because of its angular disposition it will aggressively bit into and insure retention of the clip 10 within the support 40. The smooth rounded surfaces 34–36 will provide a non-stress surface with which the cable strap or support element is in contact and hence will not fray or detract from the strength of that element.

Thus, it will be appreciated that the preferred embodiment of this invention and its generalized assembly will provide a simple, economical, quickly installed fastening system for the mounting of elongated conduits or cables at a variety of locations within hollow support means.

I claim:

1. A one-piece sheet metal clip adapted to be mounted in a channel member open along one side in an axial direction thereof, said clip including a substantially planar base, a pair of legs each connected intermediate the extremity of the leg to opposite sides of said base, each leg spaced from the base other than at its point of connection and each leg having its opposite extremities extending beyond the edges of the base joining said opposite sides, said legs being capable of flexing independently whereby said clip is maintained in oriented relationship to said channel member in spite of surface irregularities therein, an apertured retaining arm extending angularly out of the plane of said base, said retaining arm including a pair of side elements extending from said base and a transverse limb connecting said elements, each of said legs being provided at their opposite ends with a bighting edge for engaging opposed walls of said channel member and adapted to locate the base generally transversely of said channel member and said aperture in the retaining arm in accessible relationship relative to the opening in said channel.

2. A clip of the type claimed in claim 1 wherein said retaining arm is connected to one edge of said base intermediate said legs and said limb is rounded along its long edges to prevent damage to items connected thereto.

3. A clip of the type claimed in claim 1 wherein the edge at said base opposite said retaining arm carries a third leg intermediate said other legs and having a similar extent, each of said three legs are serrated to provide teeth on the extremities of said legs to enhance aggressive biting into said channel.

4. A clip of the type claimed in claim 1 wherein each of said legs is angularly disposed and slightly flexible relative to said base, the distance between the free ends of the legs extending outwardly from said base being slightly in excess of the interior dimension of said channel to ensure aggressive force fit cooperation therewith.

* * * * *